J. H. Glover,
Mill Gearing.
No. 31,078. Patented Jan. 8, 1861.
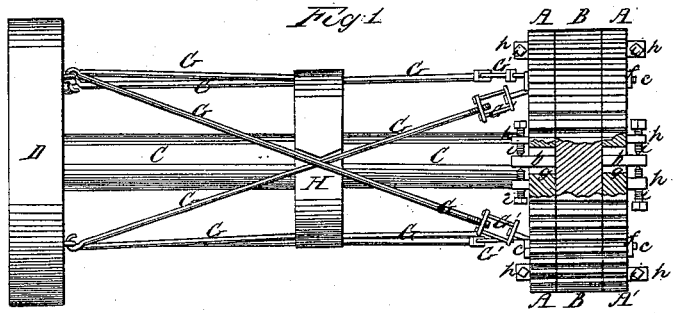
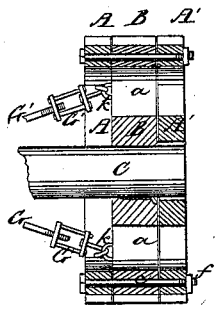
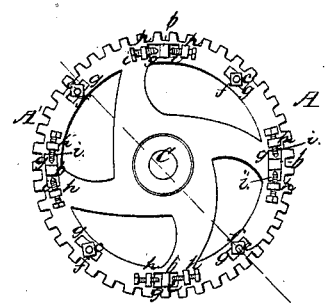
Witnesses
J. W. Coombs
R. S. Spencer
Inventor
Jos. H. Glover
per Munn & Co.
Attorneys

UNITED STATES PATENT OFFICE.

JOSEPH H. GLOVER, OF GLASGOW, KENTUCKY.

MILL-GEARING.

Specification of Letters Patent No. 31,078, dated January 8, 1861.

*To all whom it may concern:*

Be it known that I, JOSEPH H. GLOVER, of Glasgow, in the county of Barren and State of Kentucky, have invented certain new and useful Improvements in Mill-Gearing; and I do hereby declare that the following is a full, clear, and exact description thereof, reference being had to the accompanying drawings, making a part of this specification, in which—

Figure 1 is a side view of the gear wheels applied to a shaft; a portion of the wheels is broken away to show one of the adjusting devices. Fig. 2 is a diametrical section through the three gear wheels attached to a shaft, showing the manner of bolting the wheels together, and the connection of the brace rods with the central gear wheel. Fig. 3 is and end view of one of the outside adjustable gear wheels, showing the arrangement of the adjusting devices on the same.

Similar letters of reference indicate corresponding parts in the three figures.

This invention relates to certain novel improvements in gear, or toothed wheels, and it is intended more especially for the large driving gear which are used in mills, for preventing the back lash which occurs in such wheels when the spaces between the teeth are increased, in consequence of wearing of the teeth of one wheel upon another.

The invention also has for its object the employment of brace rods, in conjunction with a central tie, arranged and combined with the spur wheel in such manner that the spur wheel will be more securely confined to its shaft, and the shaft itself will be braced and strengthened against vibration or trembling.

To enable those skilled in the art to make and use my invention I will proceed to describe its construction and operation.

A, B, and A' represent three gear or toothed wheels of the same diameter, but the middle wheel B is somewhat wider than the wheels on each side of it, say about twice the width. The teeth of the three wheels are the same shape size and number. The middle spur wheel B is suitably keyed to the long driving shaft C which may be supposed to be the long shaft of the water wheel, a portion, D, of which wheel is represented on the opposite end of the shaft C, and this portion, D, is keyed to the shaft. The two outside spur wheels A and A' are not keyed to the shaft C but are secured to the sides of the main or middle wheel B, as will be hereinafter described. These outside spur wheels A, A', may be cast with arms, similar to the arms, $a$, $a$, of the middle wheel, B, so that they will have central bearings, or they may be used without these arms, and without a central bearing on the shaft C. In either case these wheels A, A' are not secured to the main shaft. They are however secured rigidly to the middle wheel B as follows: Four or more arms, $b$, $b$, $b$, $b$ are suitably secured to and project out a suitable distance from each side of the middle wheel B. These arms $b$, $b$, $b$, $b$ are all parallel with the axis of the shaft C, or rather they are perpendicular to the sides of the wheel B; and at intermediate points between these arms $b$, $b$, $b$, $b$ holes are made transversely through the rim of the middle wheel B for receiving bolts $c$, $c$, $c$, $c$. Corresponding to these arms $b$, $b$, $b$, $b$ and holes for the bolts $c$, $c$, $c$, $c$, slots $g$, $g$, $g$, $g$, are made through the rims of the two side spur wheels A, A, through which slots the arms $b$, and bolts $c$, pass when these two wheels A, A', are brought up close to the middle wheel B. The ends of the arms $b$, $b$, $b$, $b$, project out a short distance from the sides of the two wheels A A', when these wheels are placed in contact with the middle wheel B, and the screw ends of the bolts $c$, $c$, $c$, $c$ project from one side of the wheel A' sufficiently to receive the nuts $f$, $f$, $f$, $f$, which bind the two wheels A, A' rigidly to the middle wheel B. The slots through the rims of wheels A, A' are concentric with the axis of these wheels and their length will depend upon the width of the teeth and the spaces between the teeth. From each end of each slot through the wheels A A' projects (outside) an arm, or fixed nut $h$ through which passes a set screw $i$. The ends of these screws $i$ are set up against the projecting ends of the arms $b$, $b$, $b$, $b$ of the middle wheel B as shown in Figs. 1 and 3 of the drawing. Now it will be seen that by means of the transverse bolts $c$, $c$, $c$, $c$ with their nuts $f$, $f$, $f$, $f$ the two outside wheels A, A', may be clamped tightly to the midle wheel B, and that by loosening the nuts $f$, these two wheels may be adjusted with a slight rotary motion either to the right or left of the shaft C, by turning the set screws $i$, $i$, $i$, $i$ on each side of these wheels A A'. By this latter adjustment of the wheels A A' their teeth may be brought in line with the teeth on the middle wheel B, or the teeth of these two wheels A, A' may be set a little behind the teeth on the middle wheel B, and thus diminish the spaces between the teeth of the outside wheels and the teeth of the inside wheel B, after which adjustment the wheels may be again clamped together and secured in the desired position as before described.

To one side of the arm of the middle stationary wheel B, four strong metal eyes $k, k, k, k$ are secured, and to each of these eyes, two brace rods G, G are suitably attached. Each rod G is furnished with a turn buckle G', by means of which the rods may be contracted or extended lengthwise.

At about the middle of the length of the shaft C, and secured to it is a circular tie block H, which tie is equal in diameter to a circle described from the axis of wheel B, touching the eyes $k\ k\ k\ k$ to which the rods G, G are attached. This tie has deep grooves formed transversely across its periphery which grooves are at intermediate points between the eye fastenings $k$, on the wheel B.

The brace rods G, G are carried over the tie block H through the grooves in this block in the manner represented in Fig. 1 of the drawing, and secured to the fixed portion D in any suitable manner. The rods G will thus form diagonal braces for the wheel B, and as these rods are each crossed and tied together at the middle of their length, they will prevent to a great extent the shaft C from trembling, or vibrating while it is in motion, and secure the parts against any twisting strain. By means of the turn buckles G', the rods G may be tightened up when necessary. These bracing rods may be applied to shafts of any description where they are very long and liable to tremble.

From this description it will be seen that when the teeth of the middle driving wheel B become worn to such an extent that a back lash is created between the driver B and driven wheel, the two outside wheels A, A' can be set a little back by the adjusting screws, $i, i, i, i$, and the spaces between the cogs of the driving wheel may thus be gradually diminished and adapted to the size of the teeth of the driven wheel or pinion. Thus it will be seen that the teeth of the middle wheel B may be worn almost out before this wheel will become useless.

Having this described my invention, what I claim as new and desire to secure by Letters Patent is—

1. The auxiliary spur wheels A, A' in combination with the middle or main spur wheel B, the arms $b, b, b, b$, set screws $i, i, i, i$, slots $g, g, g, g$ and clamping bolts $c$, all arranged and made to operate substantially as and for the purposes herein set forth.

2. The eyes $k, k, k, k$, diagonal brace rods G, G, G, G with their turn buckles, in combination with the middle tie H, and shaft C arranged as and for the purposes specified.

JOSEPH H. GLOVER.

Witnesses:
A. WOOTEN,
J. B. MARTIN.